United States Patent
Nascimento da Silva et al.

(10) Patent No.: US 12,517,802 B2
(45) Date of Patent: Jan. 6, 2026

(54) SIMILARITY-BASED QUANTIZATION SELECTION FOR FEDERATED LEARNING WITH HETEROGENEOUS EDGE DEVICES

(71) Applicant: Dell Products L.P., Round Rock, TX (US)

(72) Inventors: Pablo Nascimento da Silva, Niterói (BR); Vinicius Michel Gottin, Rio de Janeiro (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 656 days.

(21) Appl. No.: 17/937,185

(22) Filed: Sep. 30, 2022

(65) Prior Publication Data

US 2024/0111607 A1    Apr. 4, 2024

(51) Int. Cl.
  *G06F 11/34*  (2006.01)
  *G06F 9/50*  (2006.01)
  *G06N 3/098*  (2023.01)

(52) U.S. Cl.
  CPC ........ *G06F 11/3447* (2013.01); *G06F 9/5077* (2013.01); *G06F 11/3409* (2013.01); *G06F 11/3466* (2013.01); *G06N 3/098* (2023.01)

(58) Field of Classification Search
  None
  See application file for complete search history.

(56) References Cited

U.S. PATENT DOCUMENTS

2022/0188630 A1* 6/2022 Donatelli ................ G06F 18/29

OTHER PUBLICATIONS

Fan et al., English Translation of CN 113315604. (Year: 2021).*
Wang et al., "Device Sampling for Heterogeneous Federated Learning: Theory, Algorithms, and Implementation", May 2021, IEEE INFOCOM 2021—IEEE Conference on Computer Communications. (Year: 2021).*
U.S. Appl. No. 17/869,998, titled "Edge-Weighted Quantization For Federated Learning," filed Jul. 21, 2022.
U.S. Appl. No. 17/814,055, titled "Efficient Sampling of Edge-Weighted Quantization for Federated Learning," filed Jul. 21, 2022.
B. McMahan, E. Moore, D. Ramage, S. Hampson and B. y Arcas, "Communication-Efficient Learning of Deep Networks from Decentralized Data," In Artificial Intelligence and Statistics, pp. 1273-1282, 2017.
J. Bernstein, Y. X. Wang, K. Azizzadenesheli and A. Anandkumar, "signSGD: Compressed Optimisation for Non-Convex Problems," CoRR, vol. abs/1802.04434, 2021.

* cited by examiner

Primary Examiner — Qing Yuan Wu
(74) Attorney, Agent, or Firm — Workman Nydegger (57) ABSTRACT

One example method includes receiving, by a central node, respective data and statistics from each edge node in a group of edge nodes, performing, by the central node, a similarity-based clustering of the edge nodes so that different clusters of edge nodes are defined, sampling, by the central node, edge nodes from each of the clusters to perform a quantization selection method, receiving, by the central node, from the sampled edge nodes, a respective indication of a best-performing quantization method, and electing, by the central node, a quantization method to be used by all the edge nodes.

14 Claims, 7 Drawing Sheets

SIMILARITY-BASED QUANTIZATION SELECTION FOR FEDERATED LEARNING WITH HETEROGENEOUS EDGE DEVICES

FIELD OF THE INVENTION

Embodiments of the present invention generally relate to federated learning processes. More particularly, at least some embodiments of the invention relate to systems, hardware, software, computer-readable media, and methods for selecting edge devices to implement a gradient quantization assessment process.

BACKGROUND

In some federated learning processes, edge nodes may be required to perform a gradient quantization process in such a way as to minimize a processing workload imposed on the edge node while also providing sufficient information, or gradients, to a central node to enable updating of a machine learning model shared by the edge nodes.

However, and particularly, but not only, in random edge node selection processes, the central node may select impaired edge nodes, that is, edge nodes without adequate processing capabilities for example, to perform the quantization assessment process. This type of selection process may give rise to various problems.

For example, sending gradients from each one of the edge nodes to the central server creates a significant amount of network traffic. Particularly, sending a complete gradient from the edge nodes to the central node is a traffic intensive task. Various approaches exist to perform compression of the gradients before sending the gradients to the central node, these are known as gradient quantization methods. In one such approach, some nodes in the federation are randomly selected to perform a procedure to select the best quantization for the federation. In some circumstances however, random sampling of edge nodes to run the quantization selection procedure may cause low diversification as amongst the edge nodes that are sampled.

In one approach, the selection of the edge nodes used to perform the quantization assessment is made using a random selection procedure, or by taking into consideration the available resources in the edge node, that is, whether or not an edge node has adequate computing resources to perform the gradient quantization. It is noted however, that neither of these approaches take into consideration the resource hardware and type of edge node where the procedure is running. This may cause problems with diversity of the selection of edge nodes. For example, selection of only the edge nodes with more resources that may be running in a specific environment may eliminate some edge nodes, that may have important data, from participating in the quantization process.

Another problem with some approaches is that resource-constrained edge devices may delay the federated learning cycles. In particular, the selection of the edge nodes used to perform the quantization assessment is made using a random selection procedure. This process allows for impaired nodes to be selected and, consequently, use of impaired nodes for gradient quantization may delay the whole federated learning process. Note that the federated learning process only proceeds when all nodes send their respective gradient values, with the selected quantization, to update the machine learning model at the central node. So, as the central node waits for one or more impaired nodes to respond, the federated learning process can be delayed or even stall.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to federated learning processes. More particularly, at least some embodiments of the invention relate to systems, hardware, software, computer-readable media, and methods for selecting edge devices to implement a gradient quantization assessment process.

In general, example embodiments of the invention are directed to a method for intelligently selecting edge nodes with adequate resources to provide diverse and available resources to run the quantization selection procedure in a heterogeneous federated learning setting. To this end, embodiments may collect the statistics of each one of the edge nodes in the federation, where such statistics may include, but are not limited to, the processing time, size of data collected by the edge node, memory usage, and network bandwidth. The history of the collected statistics may then be used to build similarity-based edge node clusters. A sampling procedure may then be performed by considering the number of different edge node groups, allowing a correct diversification, and excluding nodes with resource constraints. In this way, edge nodes that are suitably diverse, and also possess adequate resources, may be used to perform an assessment of a quantization process to be implemented by a federation of edge nodes as part of a federated learning process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments of the invention may intelligently select suitably capable and diverse edge nodes to run a quantization selection procedure, and thereby enable timely and effective updates to a shared machine learning model. Some embodiments may avoid selection of edge nodes that are not capable or diverse enough to support a quantization selection procedure. Some embodiments may perform a non-random edge node selection to avoid, or reduce, problems typically associated with random selection processes. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. CONTEXT

In general, some embodiments are directed to resolving one or more challenges posed by federated learning development and testing. Following is contextual information for some example embodiments.

A.1 Deep Neural Network (DNN) Training

The training of machine learning models relies on training algorithms, usually supported by optimization. These include a backpropagation algorithm and the Stochastic Gradient Descent (SGD) optimization algorithm for deep neural networks. Before initialization, a network topology of neurons and interconnecting weights may be chosen. This topology may determine how the calculations will flow through the neural network. After that, an initialization may be performed, setting the weight values to some random or pre-defined values. Finally, the training algorithm may separate batches of data and flow them through the network. Afterward, one step of backpropagation may occur, which may set the direction of movement of each of the weights through the gradients. Finally, the weights may move by a small amount, ruled by the algorithm learning rate. This process may go on for as many batches as necessary until all training data is consumed. This more significant iteration is called an epoch. The training may go on until a pre-defined number of epochs is reached, or any other criteria are met, for example, until there is no observed significant improvement over the last k epochs.

A.2 Federated Learning

Federated Learning (FL) is a machine learning technique where the goal is to train a centralized model while the training data, used to train the centralized model, remains distributed on many client nodes. Usually, the network connections and the processing power of such client nodes are unreliable and slow. The main idea is that client nodes can collaboratively learn a shared machine learning model, such as a deep neural network for example, while keeping the training data private on the client device, so the model can be learned without storing a huge amount of data in the cloud, or in the central node. Every process that involves many data-generating nodes may benefit from such an approach, and these examples are countless in the mobile computing world.

In the context of FL, a central node can be any machine with reasonable computational power that receives the updates from the client nodes and aggregates these updates on the shared model. A client node may be any device or machine that contains data that will be used to train the machine learning model. Examples of client nodes include, but are not limited to, connected cars, mobile phones, IoT (Internet of Things) devices, storage systems, and network routers.

Figure 1:
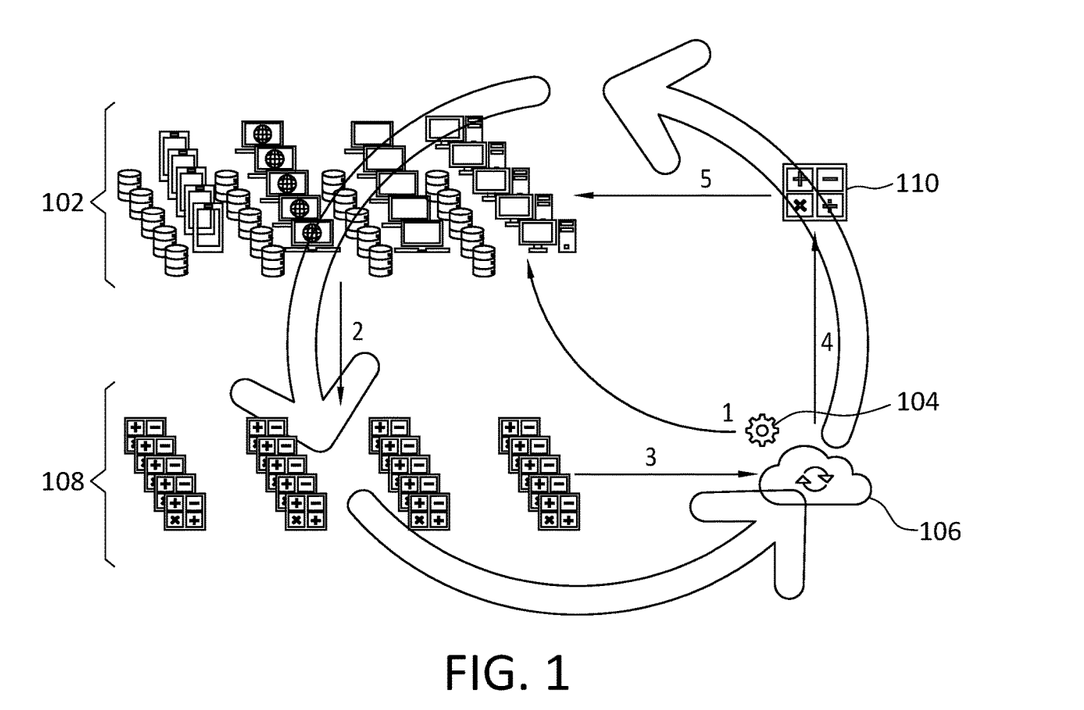
FIG. 1 discloses aspects of an example federated learning process.

The training of a Neural Network in a Federated Learning setting, shown in the example method of FIG. 1, may operate in the following iterations, sometimes referred to as 'cycles':

1. the client nodes 102 download the current model 104 from the central node 106—if this is the first cycle, the shared model may be randomly initialized;
2. then, each client node 102 trains the model 104 using its local data during a user-defined number of epochs;
3. the model updates 108 are sent from the client nodes 102 to the central node 104—in some embodiments, these updates may comprise vectors containing the gradients;
4. the central node 106 may aggregate these vectors and update the shared model 110; and
5. when the pre-defined number of cycles N is reached, finish the training—otherwise, return to 1.

A.3 Compression Techniques for Federated Learning

Figure 2:
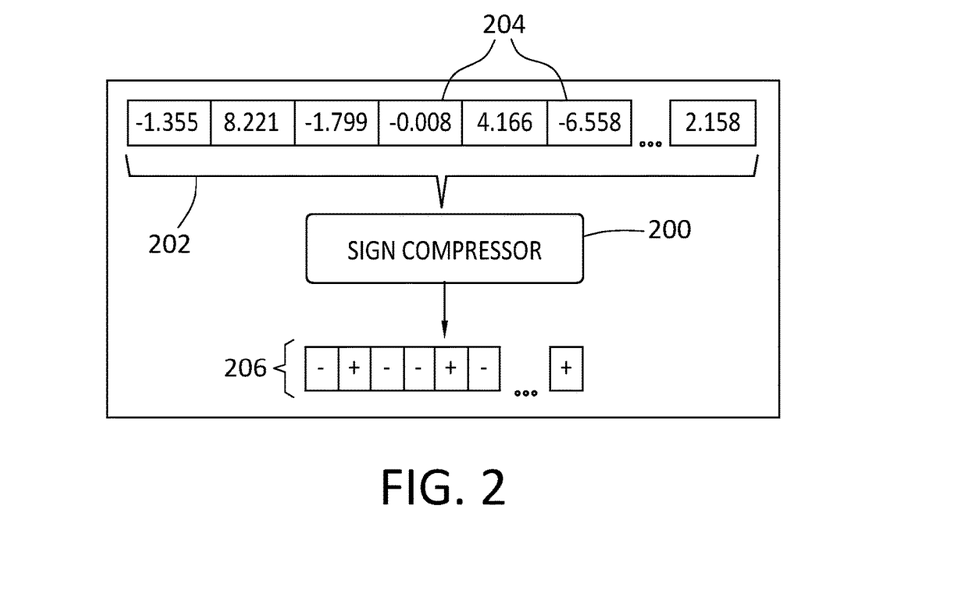
FIG. 2 discloses aspects of an example gradient compressor.

Various methods may be implemented to reduce the communication cost associated with performance of federated learning algorithms. One such method is the SIGNSGD gradient compression method with majority voting. This method may allows sending 1-bit per gradient component, that is, a 32× gain compared to a standard 32-bit floating-point representation. However, there is no known method to reduce the compression without impacting the convergence rate or final accuracy. FIG. 2 depicts a sign compressor 200 configured to compress a gradient vector 202 that comprises float numbers 204 which may each comprise a respective magnitude, and a respective sign, that is a positive (+) or negative (−) sign. In general, the sign compressor 200 may compress the gradient vector 202 by stripping out the magnitude information of each float number 204, leaving only the respective signs of the float numbers, as shown in the compressed gradient vector 206.

A.4 Dynamic Edge-Weighted Quantization for Federated Learning

Previously (see U.S. patent application Ser. No. 17/869,998, titled Edge-Weighted Quantization for Federated Learning, filed 21 Jul. 2022—incorporated herein in its entirety by this reference, and hereinafter referred to as '[1]'), methods have been disclosed for selecting the best quantization method in a federated learning training process. In this method, a number 's' of storage edge devices are sampled to perform an evaluation procedure internally that will define the best quantization procedure for the whole process. The method described in the aforementioned document has two main parts running on different levels: (i) the first one runs in the central node; (ii) the second runs inside each one of the edge storages arrays, also known as 'workers.' These stages are discussed hereafter.

With reference first to part (i), each edge storage array receives a model from the central node, as standard in any federated learning training. Then, each edge storage array processes the training step of the model using its local data. More specifically, the method running inside the edge node works as follows.

Let W be the definition of the model weights, synchronized across all nodes at the beginning of the cycle. Let F be a set of known compression (or quantization) functions, among which the identity function and the 1-bit (sign) compression, or another known maximum-compression function. Let Q be a set of loss value thresholds, one for each f∈F, with respect to the 1-bit (or sign) compression, or the known maximum—compression function.

At a training cycle, a set of selected edge storage nodes may perform a method comprising the following operations:
1. train a model Wi from W with the currently available training data. This is a standard step in any federated learning approach;
2. from the difference between Wi and W, obtain a pseudo-gradient G;
3. for each available gradient compression (or quantization function) f∈F, obtain a model Wf resulting from the updated model W with f(G). Notice that for the identify function Wf=Wi;
4. obtain a validation loss Lf for each model Wf. Where Lf=g(X|Wf), g is the machine learning model parameterized by Wf and X is the validation set of the node;
5. for each validation loss Lf compute a vector B to store whether losses are below the loss value threshold for that respective function (see example in FIG. 3); and
6. communicate, for each f∈F, one bit with the result of the boolean computation in (5. above), to the central node.

Figure 3:
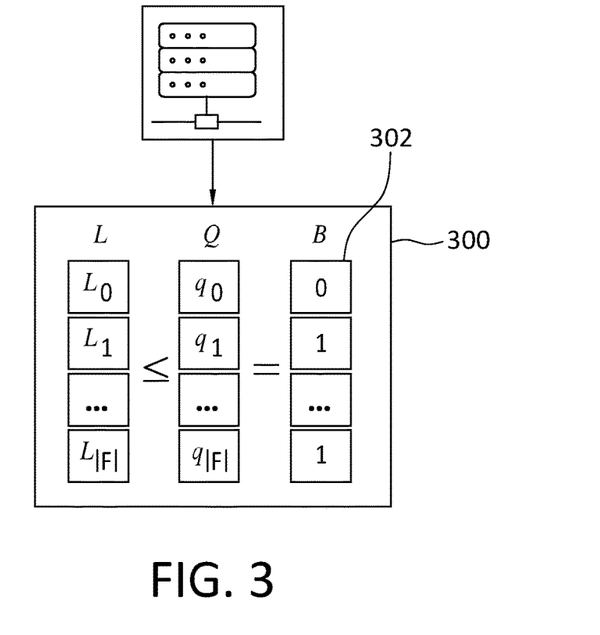
FIG. 3 discloses an example calculation of a binary vector at an edge node.

FIG. 3 discloses that inside each selected node 300, that is, selected after applying the sampling method, the binary vector B 302 may be calculated. This binary vector B 302 contains the information indicating whether a given gradient compressor f is better than its pre-defined threshold.

The second part, that is, part (ii), of the method referred to above may run inside a central node. A central node may be a server with reasonable computational power and a large capacity to deal with incoming information from the edge nodes. In the federated learning training, the central node is responsible for aggregating information from all nodes and providing guidance to generate the next step model. Here, the central node may perform these operations, but with additional operations to define the best compression algorithm to use in the subsequent few cycles. The process of selecting the ideal compression algorithm to reduce the communication bandwidth and improve the convergence rate of the federated learning training is defined as described below.

In more detail, the method (ii) running in the central node may perform a method comprising the following operations:
1. receive a set of binary vectors B from all the sampled nodes;
2. elect, via majority-voting or any other aggregation function h, the compression method, or quantization level, that was selected by most edge nodes as achieving an adequate compression/convergence tradeoff (as defined by Q); and
3. central node signals the edge nodes for the desired elected quantization level updates to be gathered.

At this point, the storage edge nodes, receiving that information, may submit their respective updates to the central node. The central node will perform an appropriate aggregation function, such as a federated average for example, on the received gradient updates to update the model W for the next cycle.

Figure 4:
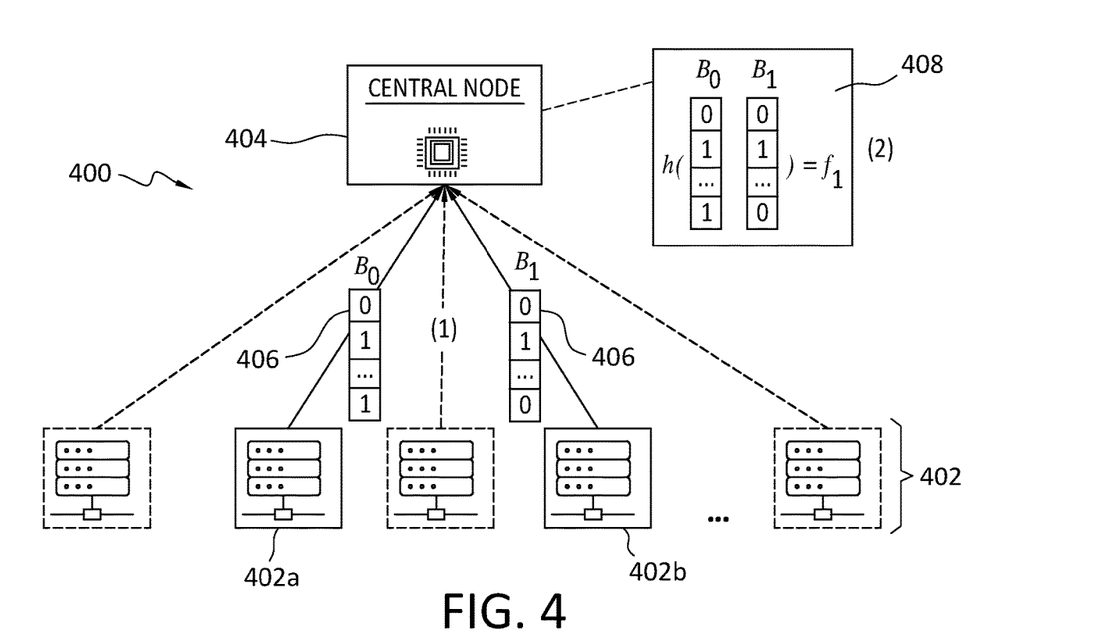
FIG. 4 discloses aspects of an example training method for an ML model.

With the foregoing discussion in view, and reference now to FIG. 4, a method 400 performed in connection with one or more edge nodes 402, and a central node 404, is disclosed. As shown there, a respective binary vector 406 may be computed inside each selected edge node 402a and 402b, and sent (1) to the central node 404. The central node 404 may then aggregate (2) the binary vectors 406 to define the compression algorithm 'f' 408 for the next training iteration (s). After that, the new compressor may be communicated back to all of the edge nodes 402, not just to the sample edge nodes 402a and 402b, and the training process continues.

A.5 Efficient Sampling of Edge-Weighted Quantization for FL

The efficient sampling of edge nodes (see U.S. patent application Ser. No. 17/814,055, titled Efficient Sampling of Edge-Weighted Quantization for Federated Learning, filed 21 Jul. 2022—incorporated herein in its entirety by this reference, and herein after referred to as '[2]'), selects the edge nodes with more available resources to run the quantization selection procedure. In an overview, this may operate as follows. First, after aggregating statistics collected from the edge nodes, an estimate may be made of the time that each one of the edge nodes uses to run their federated learning training and the quantization selection procedure, that is, when the edge node is selected to run the quantization.

Figure 5:
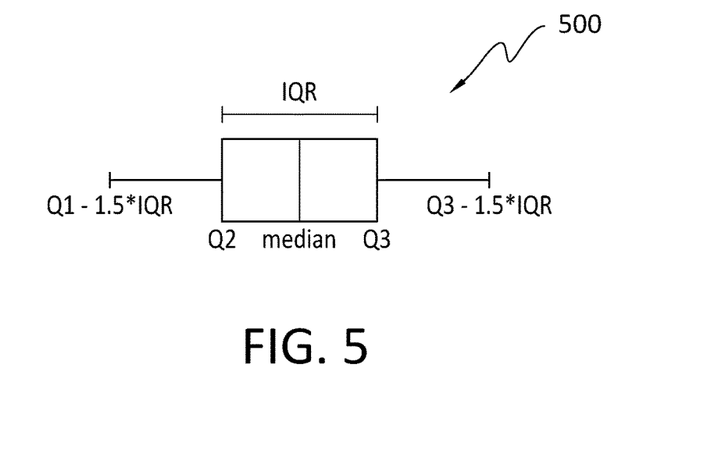
FIG. 5 discloses an example node selection process using a boxplot.

After 't' iterations, in order to select the edge nodes, a calculation may be made of the composite, or total, time formed by the federated learning training time and the execution time of the quantization selection procedure. When the latter is not available, this value may be set as 0. Then, a boxplot, such as the example boxplot 500 in FIG. 5, with the composite mean times may be created. Those values that are greater than $Q3+1.5*IQR$ are considered outliers and therefore may not selected by the algorithm. The idea behind removing the outliers is that those edge nodes can be considered time-consuming, so picking them will postpone the end of the federated learning training cycle because the system must wait until the quantization procedure ends on every machine selected to run. FIG. 5 shows an example of the boxplot 500 to identify outliers. Particularly, FIG. 5 discloses a boxplot which may be used to calculate the Interquartile range (IQR) and find outliers when the value of the composed time is higher than the third quartile (Q3) plus 1.5 IQR.

Figure 6:
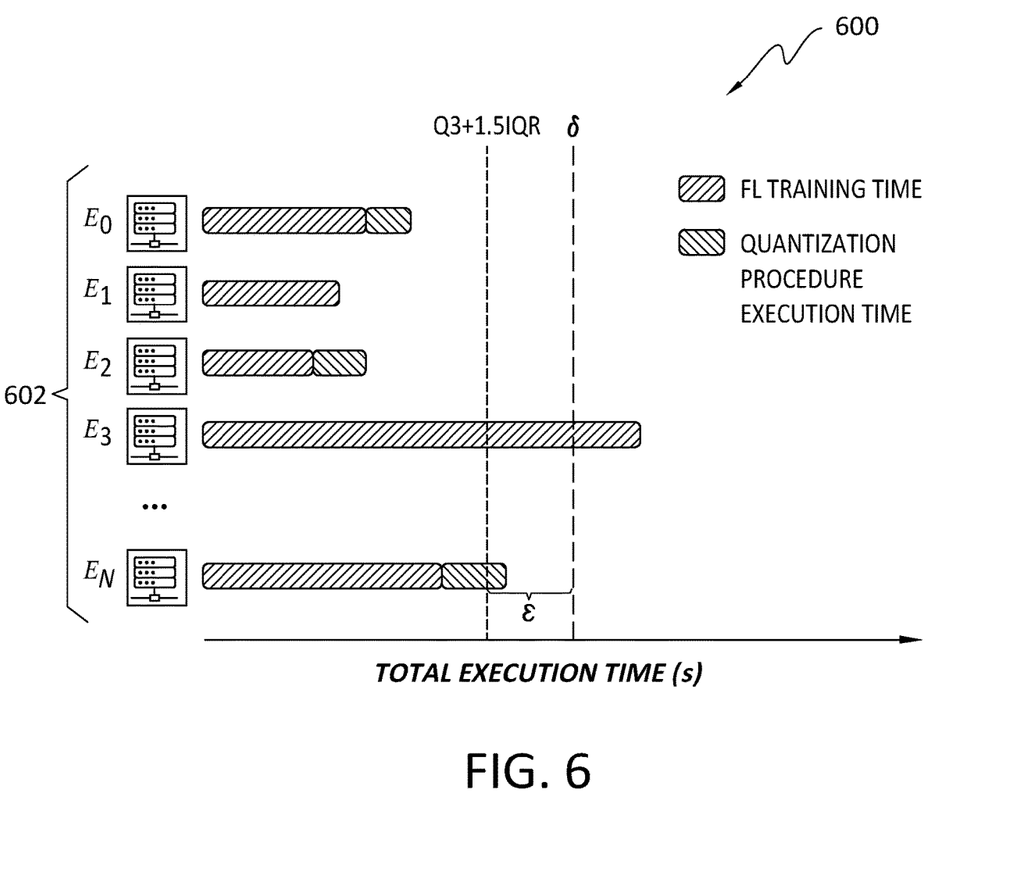
FIG. 6 discloses a plot of composite times for edge nodes to perform various operations.

After the outlier boundary is selected, a pre-defined constant ε may be added to this value. This may allow for a better fine tunning of the selection on different application domains. In the end, all edge nodes with historical mean composite time lower than the threshold δ=Q3+1.5*IQR+ε are considered efficient and may be selected to run the quantization selection procedure. After the end of the cycle, the historical values are updated, and the process repeated. FIG. 6, discussed in more detail below, shows a general overview of the method applied to a variety of edge nodes.

The efficient sampling algorithm may run as follows:
1. while the number of iterations <t, run the original naïve sampling algorithm with parameter 's';
2. from historical statistics, calculate the composite time 'cs' determined by the sum of the federated learning training time and the execution time of the quantization selection procedure;
3. build a boxplot from the composite times;
4. the boxplot identifies the outlier boundary using the IQR formula: Q3+1.5*IQR;
5. define the final cutoff threshold δ as δ=Q3+1.5*IQR+ε, where ε is a threshold to allow flexibility to the application of the method on different domains; and
6. select the edge nodes Es∈E, where cs<δ.

With reference to the illustrative example of FIG. 6, a plot 600 is disclosed that lists a group of edge nodes 602 and their respective composite times. As shown, the edge node $E_3$ has a composite time that exceeds δ and, as such, edge node $E_3$ will not be selected, in this example. Further, although edge node $E_N$ exceeds δ=Q3+1.5*IQR, the addition of the threshold ε lends flexibility to the application of the method on different domains, such that in this example, edge node $E_N$ is eligible for selection.

B. OVERVIEW

Federated Learning (FL) is a machine learning technique capable of providing model training from distributed devices while keeping their data private. This can be of great value for an enterprise that may be able to train machine learning models for a variety of distributed edge devices and apply them to various products easily, such as laptops, servers, and storage arrays, for examples. Thus, enterprises may would benefit from providing solutions and infrastructure for customers in this domain and using those solutions in its own products.

The goal of federated learning is to train a centralized global model while the training data remains distributed on many client nodes. In this context, it may be assumed that the central node can be any machine with reasonable computational power. Training a model in a federated learning setting may proceed as follows. First, the central node shares an initial model, such as a machine learning model that comprises a deep neural network, with all the distributed edge nodes. Next, the edge nodes train their instances of the model using their own data, and without sharing that with other edge nodes. Then, the central node receives the updated models from the edge nodes and aggregates those updated models into a single central model. The central node may then communicate the new model to the edge nodes, and the process repeats for multiple iterations until it reaches convergence.

In practice, updating the central model involves frequently sending from the workers each gradient update, which implies large bandwidth requirements for large models. Hence, a typical optimization in federated learning is to compress the weights in both ways of communication—the edge node compresses the updates sent to the central node, while the central node compresses the updates to be broadcast to the edge nodes for the next training cycle. Research shows that applying aggressive compression—such as down to one bit per weight for example—can be an efficient trade-off between communication overhead and convergence speed.

However, there are cases where the non-quantized, non-compressed updates could result in a sufficiently faster convergence rate to justify the higher communication costs. The development of methods for intelligently compressing gradients is desirable for FL applications. Especially when it can be done by deciding when to send a compressed gradient and when to send an uncompressed gradient while keeping the convergence rate and accuracy.

In [1], this issue was addressed by disclosing a method for intelligently compressing gradients by deciding when to send a compressed gradient and when to send an uncompressed gradient while keeping the convergence rate and accuracy at acceptable levels. It is performed by randomly selecting edge nodes to run a quantization selection procedure that establishes a good quantization for each edge node. The results are then aggregated in the central node, and all members of the federation use the final quantization, that is, the quantization method best suited to the majority of edge nodes. However, the method disclosed in the document mentioned at the beginning of this paragraph may face the following problems: (i) significant network traffic, and network bandwidth, are necessary to send all the gradients; (ii) the edge nodes that run the quantization (compression) procedure are randomly selected, which causes low edge diversification; and, (iii) resource-constrained edge devices, when selected, may delay the performance, and completion, of the federated learning cycles.

Some embodiments of the invention may expand upon, and enhance, the approach disclosed in [1]. For example, some embodiments embrace methods that intelligently, rather than randomly, select the adequate edge nodes to provide diverse and available resources to run the quantization selection procedure in a heterogeneous federated learning setting. To this end, embodiments of the invention may collect the statistics of each one of the edge nodes in a federation. Such statistics may include, but are not limited to, the processing time, size of data collected by the edge node, memory usage, and network bandwidth. Then, some embodiments may use the history of the collected statistics to build similarity-based edge node clusters. A sampling procedure may then performed by considering the number of different edge node groups, allowing a correct diversification, and excluding nodes with resource constraints.

C. ASPECTS OF SOME EXAMPLE EMBODIMENTS

Some embodiments may be directed to methods that serve to train a machine learning model using federated learning in a domain of distributed edge storage devices. Thus, some embodiments may define a set E of edge storage devices, or other edge devices, with N devices. These devices may be specialized for resource-intensive tasks, and may have limited computational power, limited bandwidth, and/or other computing resource constraints. Accordingly, some embodiments are directed to methods that may leverage the data stored in these devices, while using minimal types and amounts of computational resources such as, for example, bandwidth and CPU processing.

C.1 Introduction

As discussed earlier herein in connection with [1] and/or [2], a method has been devised for selecting the best quantization method in federated learning training. In this method, a number s of storage edge devices may be sampled to perform an evaluation procedure internally that will define the best quantization procedure for the whole process. Since this procedure runs a random sampling strategy, the federated learning cycle is delayed in some scenarios. All other edge nodes must wait until the processing of a single edge device concludes to proceed with the training.

Figure 7:
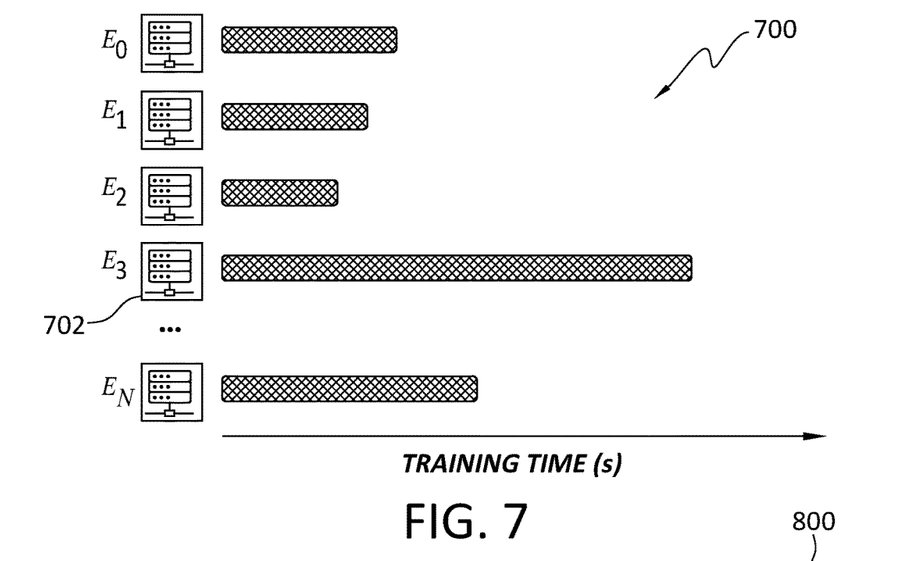
FIG. 7 discloses example training time data for edge nodes.

For example, in the graph 700 in FIG. 7, suppose that storage edge node E3 702 is selected to run the quantization selection procedure. In this case, all the other edge nodes that finished their processing earlier must wait storage edge node E3 702 finishes its procedure. This type of approach may delay the federated learning training process and, accordingly, may also delay optimization of the model that will be deployed to the edge devices. In more detail, FIG. 7 discloses the training time of each edge storage device in a collection of storage edge devices. Note that the training time of each edge node is different. This may occur due to, for example, differences in the execution mode, workloads and other respective characteristics of each edge node.

As also discussed earlier herein in connection with [1] and/or [2], an approach was disclosed that added a second layer in the selection of edge nodes to select only those edge nodes with available resources to run the quantization selection procedure. Note that in the approaches disclosed in [1] and [2], there is no guarantee as to the adequate diversity of edge nodes, nor as to the diversity of the data being used by the quantification strategy. Thus, those methods may, in some circumstances, select a quantization that is not good for all the various kinds of devices in the federation.

In light of the foregoing considerations, at least, some embodiments of the invention may thus operate to group together the edge devices using their workload and data statistics to reduce the bias in the selection of the quantization procedure and consequently performing a most adequate selection of the quantization being used in the federation. In some embodiments, this approach may be enabled by the collection of statistics from the edge device, and the data at the edge device.

C.2 Operations Performed by a Central Node

Figure 8:
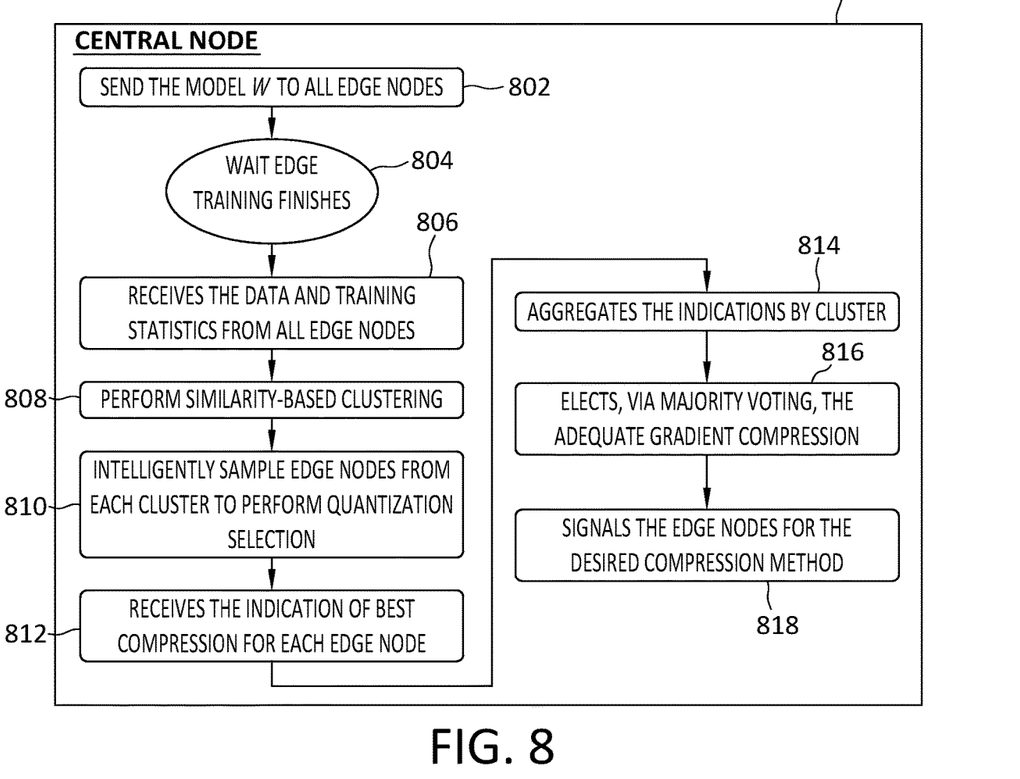
FIG. 8 discloses an example node selection process performed by a central node.

With reference now to the example of FIG. 8, various operations are disclosed for a method 800 that may be performed by a central node in a federated learning environment. The example method 800 combines various federated learning operations with quantization selection operations. More particularly, FIG. 8 discloses example operations for running a similarity-based quantization selection algorithm, and federated learning, inside the central node.

The method 800 may begin when the central node sends 802 the model W to all edge nodes. Then, the central node may wait 804 until the edge nodes training finish. Next, the central node may receive back 806 the data and training statistics from all edge nodes. These statistics may contain a large variety of information, for example the number of CPUs, GPUs, their configurations, memory, time for training, amount of data used in the training, available disk space, data statistics (such as number of features, and data distributions), and machine usage statistics, among others.

Once the statistics are received, the central node may perform 808 a similarity-based clustering in order to group similar edge nodes together. The central node may then, based on the statistics collected from the nodes, intelligently sample 810 nodes inside these groups. To do this, some embodiments may run a clustering algorithm such as, for example, k-Means, GMMs, or DBSCan. The number of clusters may be defined, such as by an expert for example, a priori or automatically in an internal cross-validation procedure. Also, a determination may be made, possibly by an expert or a computing system, as to the time for performing a re-clustering of the edge nodes. For example, the re-clustering operation may be set to run after l federated learning iterations. Typically, though not always, this number l may be quite large since, in some environments at least, it is not expected that the characteristics of edge devices will change frequently.

Once all nodes of the federation are in a group, the intelligent sampling process 810 may be performed in which each group is sampled, and several edge nodes selected to perform the quantization selection procedure. As discussed below in connection with FIG. 9, the edge nodes selected to perform the quantization procedure may send back to the central node a vector with the information about each one of the pre-defined quantization methods, as disclosed elsewhere herein.

The central node may receive 812, and aggregate 814, the indications received from each one of the clusters and then elects 816, such as by majority voting from the edge nodes for example, the adequate gradient compression to be used by all the edge nodes in the federation. The central node may then signal 818 the edge nodes, identifying the elected, that is, selected, quantization method, and the central node may then wait for the weight updates from the edge nodes.

C.3 Operations Performed by Sampled Edge Nodes

Figure 9:
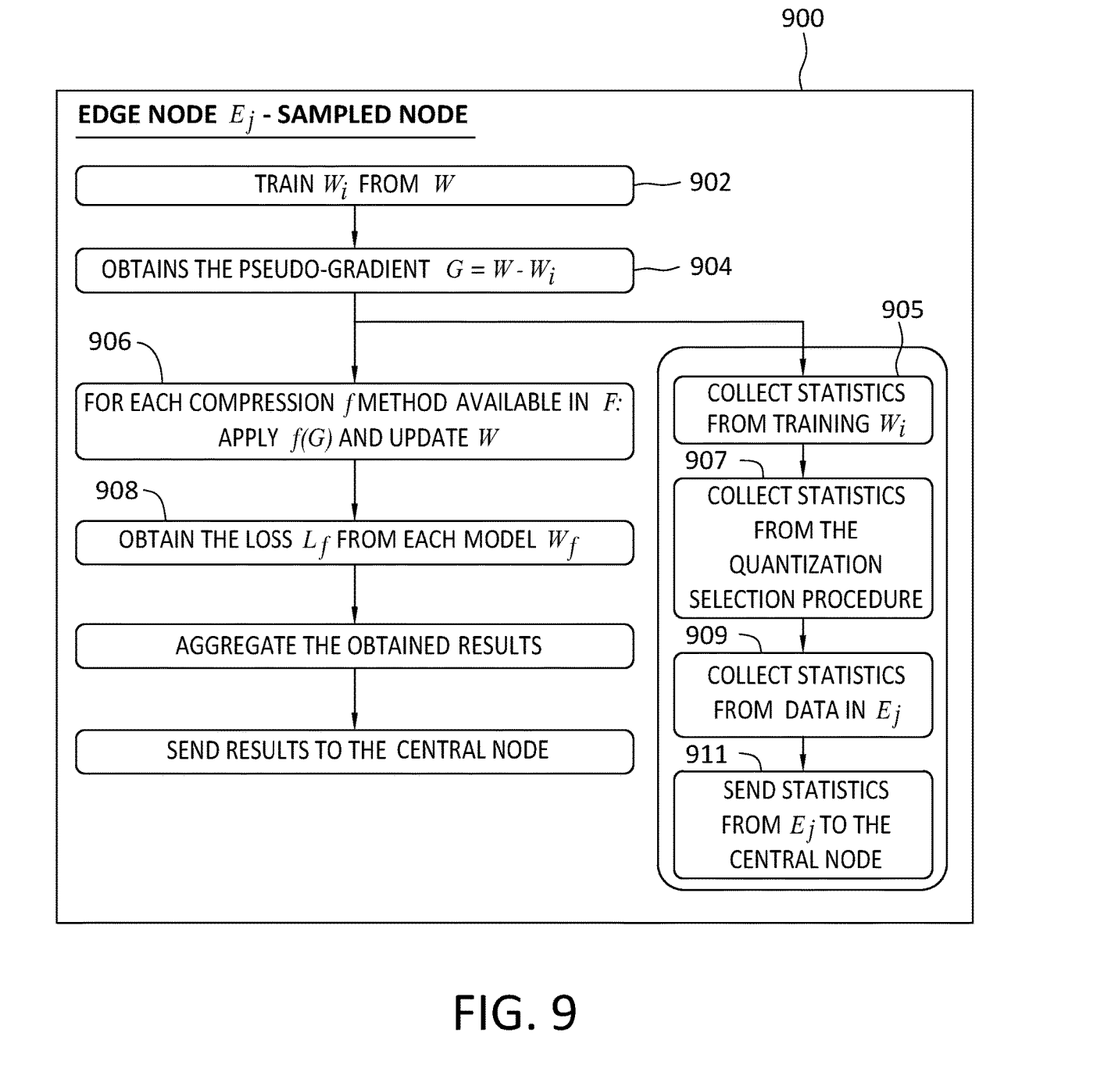
FIG. 9 discloses example processes performed by edge nodes.

In this section, a description is provided of example operations that may performed by the sampled edge nodes, as shown in FIG. 9. More particularly, FIG. 9 discloses an example method 900 for performance of various operations by a sampled, that is, a node selected to run the quantization selection procedure. The method 900 of FIG. 9 may also comprise operations to collect data and run the federated learning procedure. Note that the nodes that were not selected by the method 800 may nonetheless perform operations that may comprise, but are not limited to, the traditional federated learning training, and the collection of statistics.

These operations, performed by both sampled nodes and unsampled nodes, may comprise training 902 the model W, (local instance) from the general model W. Next, the pseudo-gradient $G=W_i-W$ may be obtained 904. For each of the gradient compression f methods available in F, the edge nodes may apply 906 $f(g)$ and update W. The loss $L_f$ from each model Wf may then be obtained 908. These results may then be aggregated by the node 910, and transmitted 912 to the central node.

With continued attention to FIG. 9, and in contrast with the non-selected nodes, also referred to herein as 'unsampled' nodes, a sampled node may additionally, that is, beyond data collection and federated learning operations, perform the quantization selection procedure. In general, this procedure operates to select the best quantization strategy for the whole federation, that is, for all the edge nodes in the federation.

For example, the sampled nodes may operate to quantize the gradients, perform training for additional operations, and get the resulting loss for this quantization. The sampled nodes may do this for a list of pre-defined quantization procedures. The results for each one of the quantizations may then be aggregated in a vector and sent back to the central node. The sampled nodes may also collect statistics about their data, training, machine configurations and others and send that information to the central node.

In the illustrative case of FIG. 9, the sampled nodes may collect statistics 905 from the training process for $W_i$. The sampled nodes may also collect statistics 907 from a quantization selection procedure performed at the sample nodes. Next, each of the sampled nodes may collect 909 statistics from, and/or concerning, the data stored at that sampled node. These statistics may then be sent 911 to the central node.

C.4 Similarity-Based Quantization Selection

Figure 10:
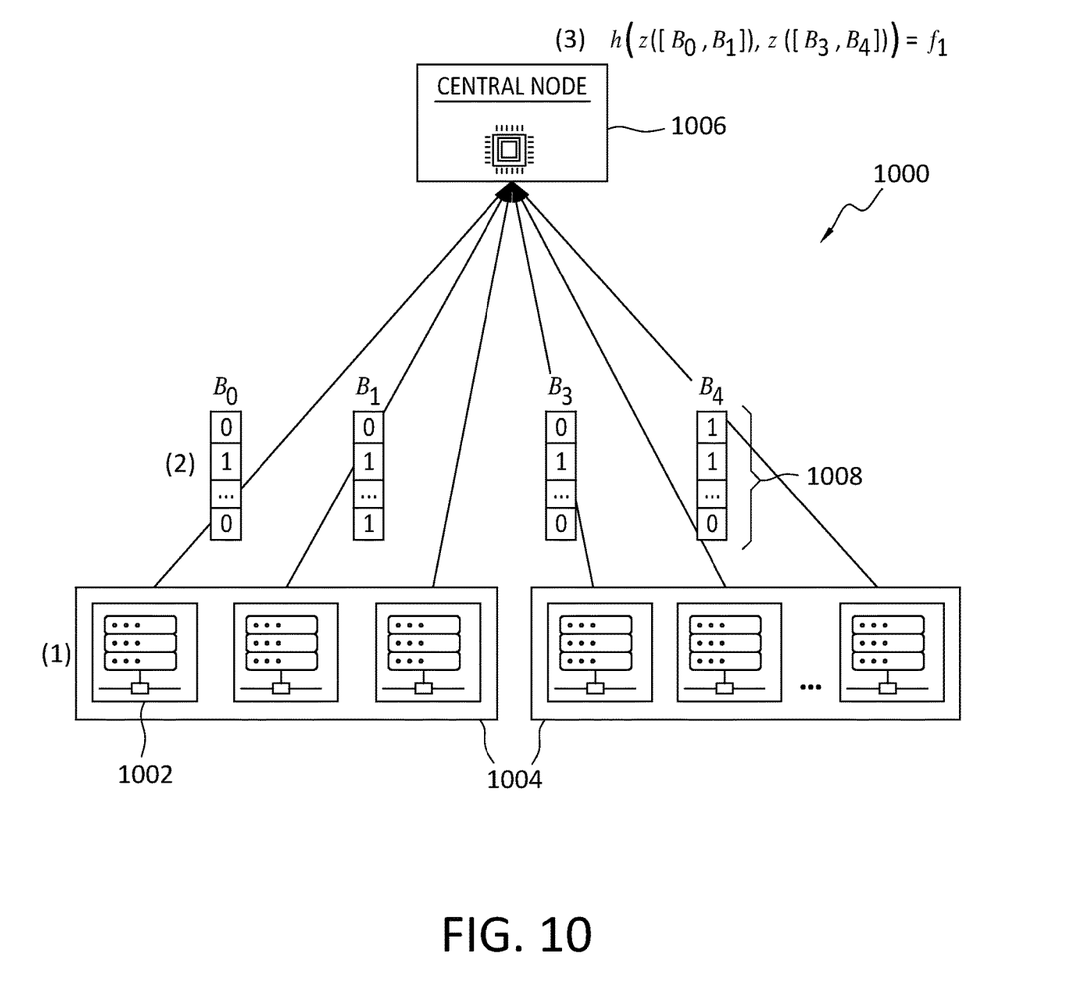
FIG. 10 discloses edge node operations and central node operations, in a node selection process.

The similarity-based quantization selection according to some embodiments may operate to group edge nodes by their respective configurations and data distributions, and may also help to ensure that that the quantization procedure is executed in a good variety of edge devices and not, for example, only in the edge devices with better hardware, or in the edge devices that are idle and could run the quantization. FIG. 10 discloses a similarity-based quantization selection method according to some embodiments.

Particularly, FIG. 10 discloses a similarity-based quantization selection method 1000 that may comprise various operations. The method 1000 may be performed in an environment that comprises various edge nodes 1002 that may be grouped together to form various groups 1004. The edge nodes 1002 may be configured to communicate with a central node 1006. The example method 1000, which may be performed cooperatively by one or more edge nodes and a central node, may begin with the clustering (1) of the edge nodes 1002 by their data and running statistics. Next, the vectors 1008 resulting from the quantization selection procedure may be collected (2) by the central node 1006. Finally, the central node may aggregate (3) the collected vectors 1008 by cluster, and then make a final decision as to the quantization procedure to be employed by aggregating the choices of each cluster 1004.

In more detail, at (1), a clustering may be performed of the edge nodes with similar data, hardware configurations, and/or other characteristics. Then at (2), a sampling may be performed of the edge nodes from each cluster 1004 by using a random selection method, or any available non-random sampling method.

The selected nodes may then run the quantization selection procedure to provide insights about which of the quantization methods is the best method to quantize the gradients of the whole federation. The operation (3), running inside the central node, may aggregate the responses of the quantization selection received by the elements of each group using a function z. This can be any function, such a mean, majority-voting, or any other aggregation that has been selected, whether by an expert, a computing system, or other selecting entity. Then, a second aggregation function h may be used to provide the result, that is, to define the quantization procedure that the federation is going to use. Note that z could be the identity function, where there is no aggregation per group, and only the function h is used for the selection of the final quantization.

D. FURTHER DISCUSSION

As will be apparent from this disclosure, example embodiments may possess various useful aspects and features. For example, some embodiments may operate to sample edge nodes without constraints on resources and bandwidth, while also looking for a correct diversification of edge nodes for sampling. This may enable the development of a smooth training in the federated learning cycle without delays caused by overloaded edge devices. Some embodiments may avoid sampling similar edge nodes to perform the quantization selection procedure, so all kinds of devices may be represented in the final selection of the quantization strategy.

E. EXAMPLE METHODS

It is noted with respect to the disclosed methods, including the example method of FIGS. 8 and 9, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: receiving, by a central node, respective data and statistics from each edge node in a group of edge nodes; performing, by the central node, a similarity-based clustering of the edge nodes so that different clusters of edge nodes are defined; sampling, by the central node, edge nodes from each of the clusters to perform a quantization selection method; receiving, by the central node, from the sampled edge nodes, a respective indication of a best-performing quantization method; and electing, by the central node, a quantization method to be used by all the edge nodes.

Embodiment 2. The method as recited in embodiment 1, wherein the statistics comprise information about data residing at the edge nodes and/or information about resource consumption by the edge nodes.

Embodiment 3. The method as recited in any of embodiments 1-2, wherein the clusters of edge nodes are defined based on a similarity between edge node statistics.

Embodiment 4. The method as recited in any of embodiments 1-3, wherein the central node aggregates the indications on a per-cluster basis.

Embodiment 5. The method as recited in any of embodiments 1-4, wherein the central node signals the edge nodes to use the elected quantization method.

Embodiment 6. The method as recited in any of embodiments 1-5, wherein the elected quantization method is usable by the edge nodes to compress respective gradients generated by the edge nodes.

Embodiment 7. The method as recited in embodiment 6, wherein the gradients comprise updates to a machine learning model running at the edge nodes, and maintained at the central node.

Embodiment 8. The method as recited in any of embodiments 1-7, wherein the elected quantization method is elected based on computing resource consumption by the edge nodes and/or machine learning model convergence performance.

Embodiment 9. The method as recited in any of embodiments 1-8, wherein the central node maintains a machine learning model by updating the machine learning model using gradient information that has been quantized with the elected quantization method.

Embodiment 10. The method as recited in any of embodiments 1-9, wherein the quantization selection method is selected from a group that comprises a collection of quantization methods, including a sign compression method and a no-compression method.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
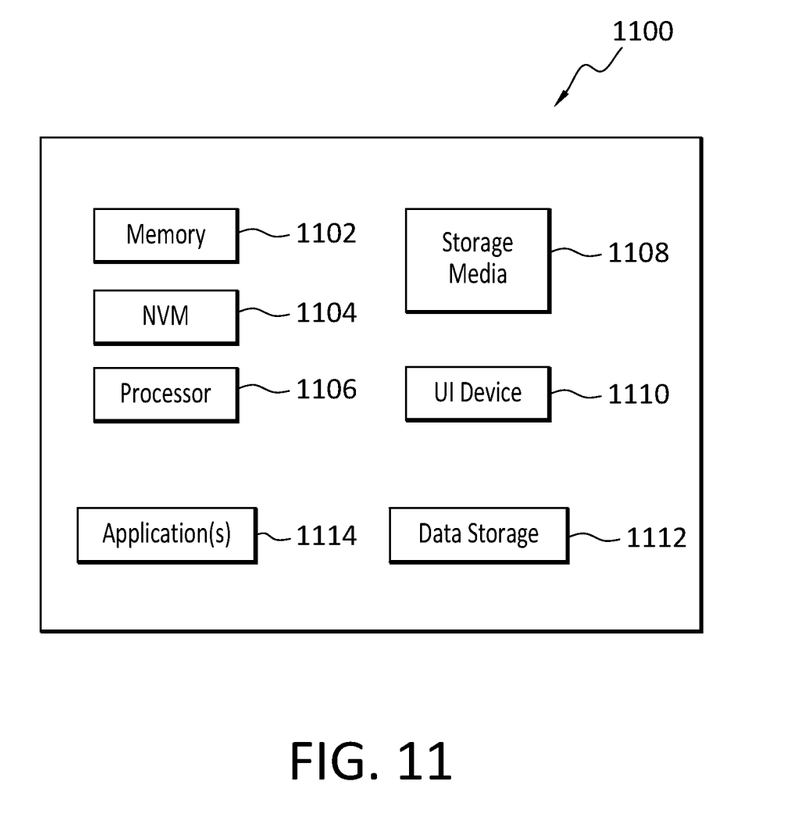
FIG. 11 discloses aspects of a computing entity operable to perform any of the disclosed methods, processes, and operations.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI (user interface) device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a federated learning process with respect to a machine learning model, comprising:
   receiving, by a central node, respective data and statistics from each edge node in a group of edge nodes;
   performing, by the central node, a similarity-based clustering of the edge nodes so that different clusters of edge nodes are defined;
   sampling, by the central node, edge nodes from each of the clusters to perform a quantization selection method;
   receiving, by the central node, from the sampled edge nodes, a respective indication of a best-performing quantization method;
   electing, by the central node, a quantization method to be used by all the edge nodes;
   receiving, by the central node from the edge nodes, respective compressed gradients that were generated by the edge nodes using the elected quantization method;
   by the central node, using the compressed gradients to update a machine learning model maintained at the central node; and
   transmitting, by the central node, the updated machine learning model to the edge nodes.

2. The method as recited in claim 1, wherein the statistics comprise information about data residing at the edge nodes and/or information about resource consumption by the edge nodes.

3. The method as recited in claim 1, wherein the clusters of edge nodes are defined based on a similarity between edge node statistics.

4. The method as recited in claim 1, wherein the central node aggregates the indications on a per-cluster basis.

5. The method as recited in claim 1, wherein the central node signals the edge nodes to use the elected quantization method.

6. The method as recited in claim 1, wherein the elected quantization method is elected based on computing resource consumption by the edge nodes and/or machine learning model convergence performance.

7. The method as recited in claim 1, wherein the quantization selection method is selected from a group that comprises a collection of quantization methods, including a sign compression method and a no-compression method.

8. A non-transitory storage medium having stored therein instructions that are executable by one or more hardware processors to perform a method for implementing a federated learning process with respect to a machine learning model, the method including operations comprising:
   receiving, by a central node, respective data and statistics from each edge node in a group of edge nodes;
   performing, by the central node, a similarity-based clustering of the edge nodes so that different clusters of edge nodes are defined;
   sampling, by the central node, edge nodes from each of the clusters to perform a quantization selection method;
   receiving, by the central node, from the sampled edge nodes, a respective indication of a best-performing quantization method;
   electing, by the central node, a quantization method to be used by all the edge nodes;
   receiving, by the central node from the edge nodes, respective compressed gradients that were generated by the edge nodes using the elected quantization method;
   by the central node, using the compressed gradients to update a machine learning model maintained at the central node; and
   transmitting, by the central node, the updated machine learning model to the edge nodes.

9. The non-transitory storage medium as recited in claim 8, wherein the statistics comprise information about data residing at the edge nodes and/or information about resource consumption by the edge nodes.

10. The non-transitory storage medium as recited in claim 8, wherein the clusters of edge nodes are defined based on a similarity between edge node statistics.

11. The non-transitory storage medium as recited in claim 8, wherein the central node aggregates the indications on a per-cluster basis.

12. The non-transitory storage medium as recited in claim 8, wherein the central node signals the edge nodes to use the elected quantization method.

13. The non-transitory storage medium as recited in claim 8, wherein the elected quantization method is elected based on computing resource consumption by the edge nodes and/or machine learning model convergence performance.

14. The non-transitory storage medium as recited in claim 8, wherein the quantization selection method is selected from a group that comprises a collection of quantization methods, including a sign compression method and a no-compression method.

* * * * *